Aug. 19, 1924.
T. E. GILMORE
CLASP
Filed Feb. 26, 1923
1,505,553
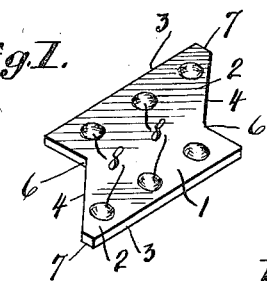
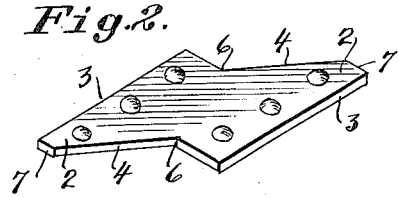
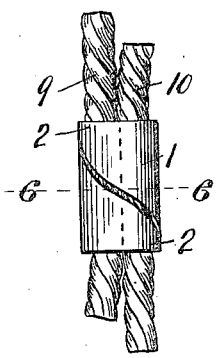
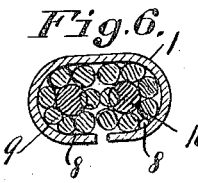
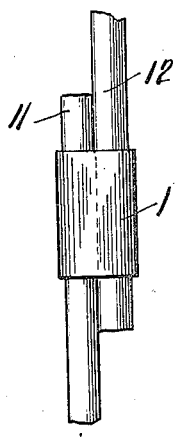
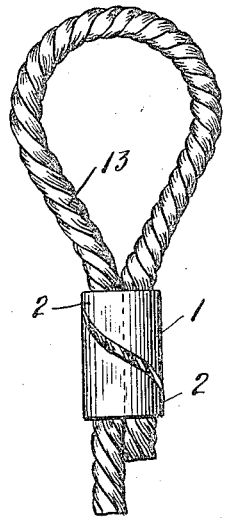
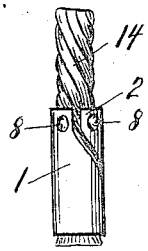
Inventor.
T. E. Gilmore
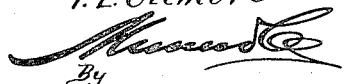
By attorneys.

Patented Aug. 19, 1924.

1,505,553

UNITED STATES PATENT OFFICE.

THOMAS E. GILMORE, OF OAKLAND, CALIFORNIA.

CLASP.

Application filed February 26, 1923. Serial No. 621,294.

*To all whom it may concern:*

Be it known that I, THOMAS E. GILMORE, a citizen of the United States, and a resident of Oakland, county of Alameda, State of California, have invented a new and useful Clasp, of which the following is a specification.

The present invention relates to improvements in clasps and has particular reference to clasps adapted to be used in connection with cables, ropes or the like for the purpose of joining two cables or ropes together or of joining the end of a cable or rope to an intermediate portion whereby a loop is formed or for the purpose of reinforcing the end of a cable or rope whereby the same is prevented from unraveling. While these are the main objects of the invention it should be understood that my clasp may be used for various other purposes within the limits of this invention.

The preferred form of my invention is illustrated in the accompanying drawing in which Figure 1 shows a perspective view of my clasp in its unfolded condition. Figure 2 a perspective view of the same showing the opposite face of the clasp, Figure 3 an end view of my clasp in a bent condition in which it would be preferably sold on the market, Figure 4 a view showing my clasp in an operative position on two cables, Figure 5 a side view of the illustration of Figure 4, Figure 6 a cross section taken along line 6—6 of Figure 4, Figure 7 an illustration showing my clasp used to form a loop in a cable, Figure 8 an illustration of my clasp as used to join two plain wires and Figure 9 an illustration of my clasp as used at the end of a rope for preventing the unraveling of the same. While I have shown only the preferred form of my invention it should be understood that various changes or modifications may be made within the scope of the claims hereto attached without departing from the spirit of the invention.

Referring to the drawing in detail my clasp comprises a strip (1) of material, preferably soft metal, having tongues (2) extending from opposite ends. The strip of material is made of such length that it may be brought into encircling engagement with a cable or rope or with two cables or ropes placed alongside one another but so that the main strip of the material encircles only a portion of the ropes or cables while the tongues (2) are made to be adapted to complete the encircling of the cables or ropes and to lie on the latter in adjacent relation. In their preferred form the tongues are shaped as indicated in the drawing, one of the sides (3) forming a continuation of the sides of the strip while the other sides (4) slant from a central portion of the ends of the strip as at (6) towards opposite sides of the strip with the extreme ends cut away as shown at (7). The face of the clasp is preferably indented in various places to form projections (8) on the inner face of the clasp adapted to be forced into gripping contact with the ropes or the cables.

While the clasps may be brought on the market in the form shown in Figures 1 and 2 it probably would facilitate the handling of the same if they were partly bent in the manner shown in Figure 3 leaving a clear space between the ends of the tongues so that the operator need only slip the clasp over the two cables or ropes and then complete the encircling engagement by a blow of the hammer or similar means.

Some of the various forms in which the clasp may be used are illustrated in Figures 4 to 9. As shown in Figures 4 to 6 two cables (9) and (10) are joined by means of the clasp while in Figure 8 two plain wires (11) and (12) are joined. In Figure 7 a single cable (13) is bent to form a loop and the extreme end of the cable is fixed to an intermediate portion by means of my clasp. In Figure 9 my clasp is shown as being secured to the end of a rope (14) for the purpose of preventing the unraveling of the same.

Various other uses may be found for my clasp within the compass of this invention.

I claim:

1. A clasp for cables and the like comprising a split sleeve having the intermediate portion of the split extending only a portion of a helical turn, and the end portions of the split extending parallel to the longitudinal axis of the sleeve.

2. A clasp for cables and the like comprising a split sleeve having the intermediate portion of the split extending only a portion of a helical turn, and the end portions of the split extending parallel to the longitudinal axis of the sleeve, and projections on the inner face of the sleeve.

3. A clasp for cables and the like comprising a split sleeve having the intermediate portion of the split extending only a portion of a helical turn, and the end portions of the split extending parallel to the longitudinal axis of the sleeve, and projections on the inner face of the sleeve arranged in series at opposite ends of the sleeve.

4. A clasp for cables and the like comprising a sheet of bendable material having two parallel side edges and two parallel end edges, an intermediate portion of each end edge being disposed at a slanting angle to the side edges and the end portions of each end edge intersecting the side edges at right angles.

THOMAS E. GILMORE.